(12) United States Patent
Rupar et al.

(10) Patent No.: US 9,045,076 B2
(45) Date of Patent: Jun. 2, 2015

(54) VEHICLE LIGHTING DEVICE

(75) Inventors: Ernesto Rupar, Cologne (DE); Patrick Verhee, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 185 days.

(21) Appl. No.: 13/613,225

(22) Filed: Sep. 13, 2012

(65) Prior Publication Data

US 2013/0077337 A1     Mar. 28, 2013

(30) Foreign Application Priority Data

Sep. 26, 2011    (DE) .......................... 10 2011 083 363

(51) Int. Cl.
*B60Q 3/04*      (2006.01)
*F21S 8/10*      (2006.01)
*B60Q 1/00*      (2006.01)

(52) U.S. Cl.
CPC .................................... *B60Q 1/0052* (2013.01)

(58) Field of Classification Search
CPC .... F21Y 2101/02; B60Q 1/18; B60Q 1/0052; F21S 48/335
USPC .................. 362/543, 545, 547, 555, 509, 487
See application file for complete search history.

(56) References Cited

U.S. PATENT DOCUMENTS

| | | | |
|---|---|---|---|
| 6,676,283 B2 * | 1/2004 | Ozawa et al. ................. | 362/547 |
| 7,780,324 B2 * | 8/2010 | Lin ................................ | 362/547 |
| 8,371,732 B2 * | 2/2013 | Charnesky et al. ........... | 362/547 |
| 2003/0147252 A1 * | 8/2003 | Fioravanti ..................... | 362/543 |
| 2005/0207167 A1 * | 9/2005 | Larson et al. ................. | 362/373 |
| 2008/0025038 A1 * | 1/2008 | Chiang ......................... | 362/547 |
| 2010/0232174 A1 * | 9/2010 | Arakawa et al. .............. | 362/547 |
| 2011/0169410 A1 * | 7/2011 | Dassanayake et al. ........ | 315/82 |

FOREIGN PATENT DOCUMENTS

| | | |
|---|---|---|
| DE | 102007018678 A1 | 10/2008 |
| DE | 102008025397 A1 | 12/2009 |

* cited by examiner

*Primary Examiner* — Anh Mai
*Assistant Examiner* — Jessica M Apenteng
(74) *Attorney, Agent, or Firm* — Raymond L. Coppiellie; Brooks Kushman P.C.

(57) ABSTRACT

Vehicle lighting device that comprises at least two light-emitting strips, wherein the light-emitting strips can each be controlled selectively and are allocated to different functions.

18 Claims, 1 Drawing Sheet

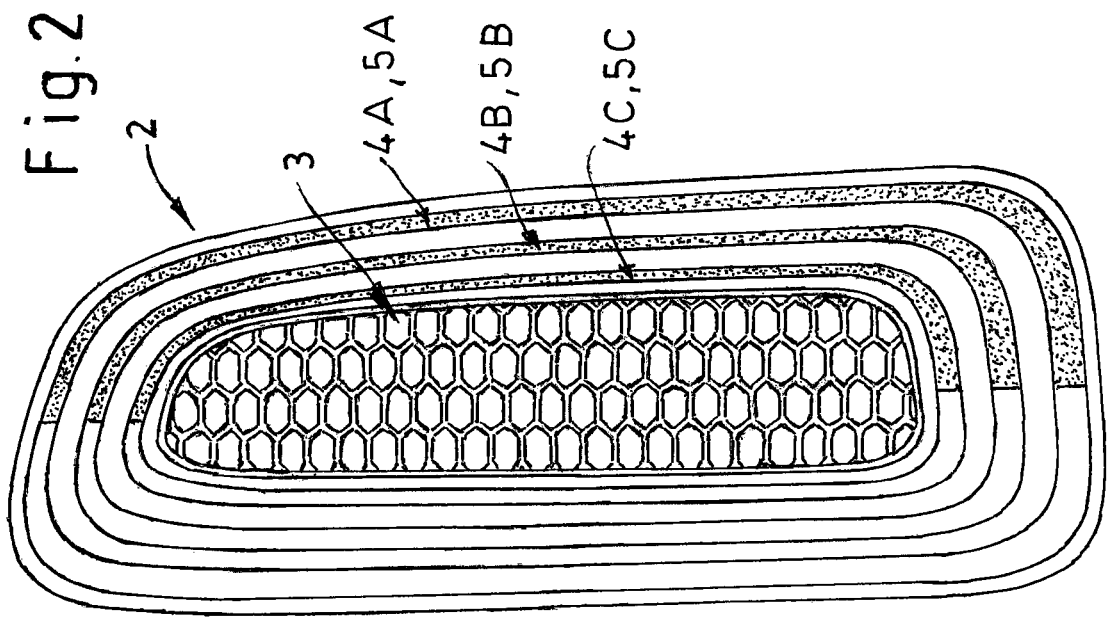
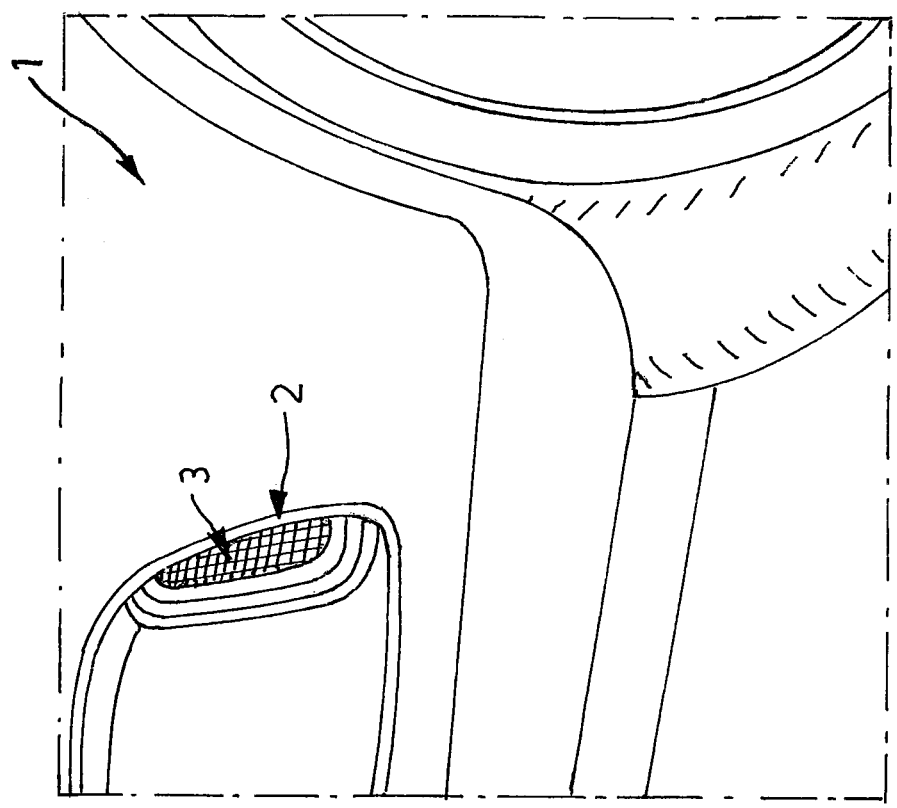

VEHICLE LIGHTING DEVICE

CROSS-REFERENCE TO RELATED APPLICATIONS

This application claims foreign priority benefits under 35 U.S.C. §119(a)-(d) to DE 10 2011 083363.3, filed Sep. 26, 2011, which is hereby incorporated by reference in its entirety.

TECHNICAL FIELD

The invention relates to a vehicle lighting device comprising at least two light-emitting strips.

BACKGROUND

DE 102007018678 A1 discloses a radiator grille for a vehicle, in which are provided a plurality of lamellae that extend substantially in parallel one with the other and at least one of the lamellae comprises a lighting device. A light conductor or LEDs are used inter alia as the lighting device. As far as the function is concerned, the lighting device can perform an additional upper beam function, a position lamp function, a daytime running lamp function, a parking lamp function, a side-marker lamp function, a fog lamp function and/or a direction indicator function.

DE 102008025397 A1 discloses a further vehicle lighting device that comprises at least two semi-conductor light-emitting elements. The vehicle lighting device comprises at least two groups of light-emitting elements that in turn each comprise at least one semi-conductor light-emitting element. It is intended that the groups of light-emitting elements can be selectively controlled and the first light-emitting element group comprises at least a fog lamp function.

In contrast thereto, the object of the present invention is to provide a vehicle lighting device that uses a compact arrangement whilst exploiting the arrangement for the purpose of fulfilling the lighting function.

SUMMARY

This object is achieved by virtue of the vehicle lighting device disclosed in claim 1.

By virtue of the fact that the light-emitting strips can each be controlled selectively and are allocated to different functions, it is possible to control the light-emitting strips in a purposeful manner for the purpose of performing the lighting function and by using the strips as light-emitting means to achieve simultaneously a compact arrangement.

In particular, if the light-emitting strips are arranged nestling one against the other, it is possible to influence the lighting functions of the strips in a purposeful manner. For example, in each case the largest light-emitting strip can be used for the lighting function with the largest required light intensity.

The term 'nestling one against the other' is presently understood to be an arrangement of light-emitting strips where these extend one adjacent to the other and almost one around the other, so that they are arranged in a similar manner to concentric circles/ovals. The light-emitting strips therefore extend in longitudinal regions practically in parallel one adjacent to the other and in arcuate regions approximately concentrically with each other. In so doing, the largest light-emitting strip lies on the outside and the smallest light-emitting strip lies on the inside. In so doing, the larger light-emitting strip encompasses the smaller light-emitting strips, etc.

It is particularly preferred if a light-emitting strip fulfills a fog lamp function. In particular, this is the inner light-emitting strip or strips, as these are the smaller.

It is likewise particularly preferred if a light-emitting strip fulfills a daytime running lamp function or a position lamp function or a parking lamp function or a side-marker lamp function. In particular, this is the outer light-emitting strip, as this is the largest.

The lighting device is expediently arranged in the region of the front spoiler. The arrangement in each case of a lighting device in air sockets or air inlets that are arranged on the left and the right is particularly desired.

In the preferred embodiment, the wall of the air sockets is stepped inwards, wherein a light-emitting strip is arranged respectively in a step. The light-emitting strips are therefore nestled one inside the other and arranged in a stepped manner approximately in the longitudinal direction of the air sockets.

The vehicle lighting device is expediently arranged in a separate housing, in particular a lamp module, so that it can be installed as desired.

BRIEF DESCRIPTION OF THE DRAWINGS

FIG. 1 shows a schematic, perspective view of a front spoiler region of a motor vehicle having an air inlet and FIG. 2 shows a schematic plan view of the vehicle lighting device that is integrated in the air inlet shown in FIG. 1.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates the front spoiler region of a passenger vehicle and the passenger vehicle is designated as a whole by the reference numeral 1. An air inlet 2 is shown that is provided in an identical but mirror-image manner on the corresponding other side of the spoiler.

The air inlet 2 is stepped inwards and in the direction of the vehicle and is embodied in a tapered manner. The air inlet 3 that is actually arranged approximately in a central manner is provided with a decorative grille.

A light-emitting strip 5A, B, C is provided respectively on each of the steps 4A, B, C that are embodied in this manner, said light-emitting strips each being selectively controllable and allocated to different functions.

The light-emitting strips 5A, B, C are arranged nestling one against the other in such a manner that they extend one adjacent to the other and almost one around the other, so that they are arranged in a similar manner to concentric circles/ovals, wherein, however, the light-emitting strips are not embodied in a circumferential manner.

The light-emitting strips therefore extend in longitudinal regions practically in parallel one adjacent to the other and in arcuate regions approximately concentrically with each other. In so doing, the largest light-emitting strip 5A lies on the outside and the smallest light-emitting strip 5C lies on the inside; the medium-sized light-emitting strip 5B is arranged between the two.

As a consequence, the outer light-emitting strip 5A is the largest strip and the inner light-emitting strip 5C is the smallest strip.

The largest outer light-emitting strip 5A fulfills a daytime running lamp function (for the EU) or the position lamp function (for the USA).

The medium-sized light-emitting strip 5B fulfills a fog lamp function of step 1 and the inner light-emitting strip 5C likewise fulfills a fog lamp function of step 2.

The light-emitting strips 5A, B, C are presently energized by different light sources and are embodied as light conductors. It is also feasible to use other technologies, such as LEDs etc.

In so doing, the entire lighting device is embodied as a lamp module, so that it can be installed as desired.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle lighting device for a motor vehicle, that comprises at least two light-emitting strips, wherein the light-emitting strips can each be controlled selectively and are allocated to different functions;
    wherein the lighting device is arranged on a wall surrounding an air inlet in the region of a front spoiler, wherein the wall of the air inlet is stepped inwards to guide air to the inlet and each light-emitting strip is arranged on a respective step;
    wherein the light-emitting strips extend in parallel at least in sections; and the light-emitting strips extend arcuately in other sections.

2. The vehicle lighting device as claimed in claim 1, wherein the light-emitting strips are arranged one nestling against the other.

3. The vehicle lighting device as claimed in claim 1, wherein an inner light-emitting strip or strips of the at least two light emitting strips fulfills a fog lamp function.

4. The vehicle lighting device as claimed in claim 1, wherein an outer light-emitting strip of the at least two light emitting strips fulfills a daytime running lamp function or a position lamp function or a parking lamp function or a side-marker lamp function.

5. The vehicle lighting device as claimed in claim 1, wherein in each case a lighting device is arranged in the air inlets that are arranged on the left and the right of the vehicle.

6. The vehicle lighting device as claimed in claim 1, wherein the vehicle lighting device is arranged in a separate housing of a a lamp module.

7. The vehicle lighting device of claim 1 wherein the light-emitting strips are light conductors.

8. A vehicle comprising:
    an air inlet adjacent to a front spoiler of a vehicle;
    a tapered wall surrounding the air inlet and having an inner step and an outer step;
    an inner light-emitting strip extending along at least a portion of the inner step; and
    an outer light-emitting strip extending along at least a portion of the outer step;
    wherein the inner and outer light-emitting strips are controlled selectively and allocated to different functions.

9. The vehicle of claim 8 wherein the inner step is positioned between the air inlet and the outer step.

10. The vehicle of claim 8 wherein the tapered wall has an intermediate step positioned between the inner step and the outer step, the vehicle further comprising:
    an intermediate light-emitting strip extending along at least a portion of the intermediate step.

11. The vehicle of claim 8 wherein the inner and outer light-emitting strips are nestled one against the other;
    wherein the inner and outer light-emitting strips extend parallel to one another in a first region; and
    wherein the inner and outer light-emitting strips extend arcuately and concentrically to one another in a second region.

12. The vehicle of claim 8 wherein the inner light-emitting strip is smaller than the outer light-emitting strip.

13. The vehicle of claim 8 wherein the inner and outer light-emitting strips are light conductors.

14. The vehicle of claim 13 further comprising a first light source adapted to energize the inner light-emitting strip; and
    a second light source adapted to energize the outer light-emitting strip.

15. The vehicle of claim 8 wherein the inner and outer light-emitting strips are positioned on an outer surface of the vehicle.

16. A lighting device for a front spoiler of a vehicle comprising:
    a tapered wall surrounding a centrally located air inlet having a decorative grille, the wall having an inner step and an outer step, the inner step positioned between the air inlet and the outer step;
    a first light-emitting strip extending along at least a portion of the inner step, the first light-emitting strip having a longitudinal region positioned between a first arcuate end region and a second arcuate end region; and
    a second light-emitting strip extending along at least a portion of the outer step, the second light-emitting strip having a longitudinal region positioned between a first arcuate end region and a second arcuate end region.

17. The lighting device of claim 16 wherein the longitudinal region of the first light-emitting strip and the longitudinal region of the second light-emitting strip are parallel with one another;
    wherein the first arcuate end region of the first light-emitting strip and the first arcuate end region of the second light-emitting strip are arranged concentrically;
    wherein the second arcuate end region of the first light-emitting strip and the second arcuate end region of the second light-emitting strip are arranged concentrically.

18. The lighting device of claim 16 wherein the first light-emitting strip and the second light-emitting strip are light conductors energized by light sources.

* * * * *